United States Patent
Kamio et al.

(10) Patent No.: US 11,524,443 B2
(45) Date of Patent: Dec. 13, 2022

(54) PROCESS FOR PRODUCING SHAPED FILM

(71) Applicants: MITSUI CHEMICALS, INC., Tokyo (JP); HOPNIC LABORATORY CO., LTD., Sabae (JP)

(72) Inventors: Hiroyuki Kamio, Nagoya (JP); Yoshimitsu Aiiso, Sabae (JP)

(73) Assignees: MITSUI CHEMICALS, INC., Tokyo (JP); HOPNIC LABORATORY CO., LTD., Sabae (JP)

( * ) Notice: Subject to any disclaimer, the term of this patent is extended or adjusted under 35 U.S.C. 154(b) by 66 days.

(21) Appl. No.: 16/078,740

(22) PCT Filed: Feb. 24, 2017

(86) PCT No.: PCT/JP2017/007050
§ 371 (c)(1),
(2) Date: Aug. 22, 2018

(87) PCT Pub. No.: WO2017/146201
PCT Pub. Date: Aug. 31, 2017

(65) Prior Publication Data
US 2019/0061226 A1 Feb. 28, 2019

(30) Foreign Application Priority Data

Feb. 24, 2016 (JP) .............................. JP2016-032656

(51) Int. Cl.
*B29C 51/10* (2006.01)
*B29D 11/00* (2006.01)
(Continued)

(52) U.S. Cl.
CPC .......... *B29C 51/10* (2013.01); *B29C 35/0288* (2013.01); *B29C 51/008* (2013.01);
(Continued)

(58) Field of Classification Search
CPC ........ B29D 11/00644; B29D 11/00009; B29D 11/0073; B29C 51/10; B29C 51/421;
(Continued)

(56) References Cited

U.S. PATENT DOCUMENTS 3,051,054 A * 8/1962 Crandon .............. G02B 5/3033
359/487.02
5,283,029 A 2/1994 Ellemor
(Continued)

FOREIGN PATENT DOCUMENTS

DE 10000859 A1 10/2000
EP 2327532 A1 6/2011
(Continued)

OTHER PUBLICATIONS

International Search Report (PCT/ISA/210) dated Apr. 11, 2017, by the Japanese Patent Office as the International Searching Authority for International Application No. PCT/JP2017/007050.
(Continued)

*Primary Examiner* — Mathieu D Vargot
(74) *Attorney, Agent, or Firm* — Buchanan, Ingersol & Rooney PC

(57) ABSTRACT

The method of the present invention for producing a shaped film includes a step of arranging a thermoplastic resin film to divide a space into a first space located on one surface side of the film, and a second space located on the other surface side, a step of heating the thermoplastic resin film, a step of curving the thermoplastic resin film in one space by using a difference in pressure between the first space and the second space, a step of stopping the curving step of the thermoplastic resin film in a state where at least a convex curved surface of both surfaces of the film is exposed into the space, and a step of cooling the curved film.

21 Claims, 6 Drawing Sheets

(51) Int. Cl.
| | |
|---|---|
| B29C 51/42 | (2006.01) |
| B29C 35/02 | (2006.01) |
| B29C 51/00 | (2006.01) |
| B29C 51/06 | (2006.01) |
| B29C 51/36 | (2006.01) |
| B29C 51/46 | (2006.01) |
| G02B 5/30 | (2006.01) |
| G02C 7/12 | (2006.01) |
| B29K 77/00 | (2006.01) |
| B29C 35/08 | (2006.01) |
| B29K 23/00 | (2006.01) |
| B29K 69/00 | (2006.01) |
| B29K 67/00 | (2006.01) |
| B29K 27/06 | (2006.01) |
| B29K 79/00 | (2006.01) |
| B29K 29/00 | (2006.01) |
| B29L 11/00 | (2006.01) |
| B32B 27/34 | (2006.01) |
| B32B 27/36 | (2006.01) |

(52) U.S. Cl.
CPC ........... *B29C 51/06* (2013.01); *B29C 51/365* (2013.01); *B29C 51/421* (2013.01); *B29C 51/424* (2013.01); *B29C 51/426* (2013.01); *B29C 51/46* (2013.01); *B29D 11/00009* (2013.01); *B29D 11/0073* (2013.01); *B29D 11/00644* (2013.01); *G02B 5/3033* (2013.01); *G02C 7/12* (2013.01); *B29C 2035/0822* (2013.01); *B29C 2791/006* (2013.01); *B29C 2791/007* (2013.01); *B29K 2023/00* (2013.01); *B29K 2027/06* (2013.01); *B29K 2029/04* (2013.01); *B29K 2067/00* (2013.01); *B29K 2069/00* (2013.01); *B29K 2077/00* (2013.01); *B29K 2079/08* (2013.01); *B29L 2011/0016* (2013.01); *B32B 27/34* (2013.01); *B32B 27/36* (2013.01)

(58) Field of Classification Search
CPC ... B29C 51/008; B29C 35/0288; B29C 51/06; B29C 51/426; B29C 51/365; B29C 51/424; B29C 51/46
See application file for complete search history.

(56) References Cited

U.S. PATENT DOCUMENTS

| | | | |
|---|---|---|---|
| 6,220,703 B1 | 4/2001 | Evans et al. | |
| 6,391,231 B1 | 5/2002 | Evans et al. | |
| 6,413,641 B1 | 7/2002 | Yamasaki et al. | |
| 6,432,327 B2 | 8/2002 | Beeloo et al. | |
| 6,585,373 B2 | 7/2003 | Evans et al. | |
| 6,759,090 B2 | 7/2004 | Loshak et al. | |
| 6,835,348 B2 | 12/2004 | Hirosue et al. | |
| 7,002,744 B2 | 2/2006 | Evans et al. | |
| 7,326,373 B2 | 2/2008 | Sidhu et al. | |
| 7,459,120 B2 | 12/2008 | Herod et al. | |
| 7,476,415 B2 | 1/2009 | Jiang | |
| 7,581,832 B2 | 9/2009 | Begon et al. | |
| 8,187,712 B2 | 5/2012 | Ryu et al. | |
| 2001/0028435 A1 | 10/2001 | Evans et al. | |
| 2001/0028436 A1 | 10/2001 | Evans et al. | |
| 2001/0038438 A1 | 11/2001 | Beeloo et al. | |
| 2002/0090516 A1 | 7/2002 | Loshak et al. | |
| 2002/0160214 A1 | 10/2002 | Hirosue et al. | |
| 2003/0030173 A1 | 2/2003 | Oakey et al. | |
| 2004/0222537 A1 | 11/2004 | Sidhu et al. | |
| 2005/0121835 A1 | 6/2005 | Herod et al. | |
| 2006/0169407 A1 | 8/2006 | Jiang | |
| 2006/0213611 A1 | 9/2006 | Jiang | |
| 2007/0195422 A1 | 8/2007 | Begon et al. | |
| 2008/0006368 A9 | 1/2008 | Jiang | |
| 2009/0201584 A1 | 8/2009 | Ryu et al. | |
| 2015/0091220 A1* | 4/2015 | Kawaguchi | B29C 51/10 264/500 |

FOREIGN PATENT DOCUMENTS

| | | | |
|---|---|---|---|
| FR | 2177600 A1 | 11/1973 | |
| JP | 51119760 A | 10/1976 | |
| JP | S55-132215 A | 10/1980 | |
| JP | S61-501504 A | 7/1986 | |
| JP | 62263021 A | 11/1987 | |
| JP | 5004895 B2 | 1/1993 | |
| JP | 8001765 A | 1/1996 | |
| JP | 2003533719 A | 11/2003 | |
| JP | 2004261961 A | 9/2004 | |
| JP | 2004351631 A | 12/2004 | |
| JP | 2005289040 A | 10/2005 | |
| JP | 2008529077 A | 7/2008 | |
| JP | 2009527783 A | 7/2009 | |
| JP | 2011201267 A | 10/2011 | |
| JP | 2012056315 A | 3/2012 | |
| JP | 2013-107301 A | 6/2013 | |
| JP | 2014131858 A | 7/2014 | |
| WO | 2009098886 A1 | 8/2009 | |

OTHER PUBLICATIONS

Written Opinion (PCT/ISA/237) dated Apr. 11, 2017, by the Japanese Patent Office as the International Searching Authority for International Application No. PCT/JP2017/007050.

Extended Search Report issued by the European Patent Office in corresponding European Patent Application No. 17756635.3-1014 dated Oct. 1, 2019 (12 pages).

Office Action dated Oct. 27, 2020, by the Japanese Patent Office in corresponding Japanese Patent Application No. 2017-165424. (2 pages).

\* cited by examiner (a)

(b)

PROCESS FOR PRODUCING SHAPED FILM

TECHNICAL FIELD

The present invention relates to a process for producing a shaped film.

BACKGROUND ART

A plastic polarizing lens can prevent from transmitting reflected light. The lens is therefore used for the protection of eyes by blocking intense reflected light outdoors, for example, in ski area or for fishing, for safety-ensuring by shielding reflected light from oncoming cars when a car is driven, and for other purposes. The plastic polarizing lens is formed by stacking a plastic lens substrate and a polarizing film onto each other. As the polarizing film, a shaped film is used.

Patent Document 1 discloses a process for producing a polarizing film which includes introducing a gas into a member which surrounds the periphery of one of the two surfaces of a film to pressurize the surface, and then pressing the other surface of the film onto a surface of a heated mold. Furthermore, the literature discloses a plastic product including the resultant polarizing film.

Patent Document 2 discloses a process for producing a polyimide film shaped product which includes closely adhering the polyimide film onto a surface of a mold to shape the film by using of a difference in pressure between a space to which one of surfaces of a polyimide film is exposed and a space to which the other surface is exposed.

Patent Document 3 discloses a method of using a low-pressure air flow to push and pressure a thermoplastic sheet onto a mold to shape the sheet thermally.

Patent Document 4 discloses a method of using a mold to shape a thermoplastic polyester under predetermined temperature conditions. The literature further discloses a plastic polarizing lens including the resultant polarizing film.

Patent Document 5 discloses a method of bringing a wafer into contact with a mold having a predetermined shape to make the wafer into a curved form. Furthermore, the literature also discloses an optical material including the resultant curved wafer.

Patent Document 6 discloses a mold for pressure forming. The literature further discloses a method of using this mold to shape a film or sheet by pressure of pressurized air.

Patent Document 7 describes a method of pushing a pre-heated polarizing film having a planar shape onto a convex surface of a lens substrate while pressing the film with a pad, and then bonding the film through a pressure-sensitive-adhesive layer onto the convex surface of the lens substrate (FIG. 2).

Patent Document 8 describes a method of using the same film to push and spread a latex onto a convex surface of a lens substrate to shape the film, and further bonding the film, through a layer of the latex that is formed on the convex surface, to the convex surface of the lens substrate (FIGS. 3A to 3C).

RELATED DOCUMENT

Patent Document

Patent Document 1: JP 2003-533719 A
Patent Document 2: JP 2004-261961 A
Patent Document 3: JP 2005-289040 A
Patent Document 4: WO 2009/098886 A1
Patent Document 5: JP 2012-56315 A
Patent Document 6: JP 2014-131858 A
Patent Document 7: JP 2009-527783 A
Patent Document 8: JP 2008-529077 A

DISCLOSURE OF THE INVENTION

Technical Problems

However, in the techniques described in Patent Documents 1 to 8, there remain rooms for improvement in the following points:

In a method, as described in Patent Documents 1 to 6, in which a film is pushed and pressured, or caused to adhere closely onto a surface of a mold to shape the film, at the time when an foreign substance is present on the mold surface, the shape of the foreign substance may be transferred onto the shaped film, so that a desired surface shape may not be obtainable. Furthermore, the foreign substance may adhere onto a surface of the shaped film to contaminate the surface. In such manners, there remains a room for improving the yield of products.

Furthermore, this method requires keeping the mold surface clean constantly. Thus, the maintenance and the management of the mold are complicated, to have a room for improving the production efficiency of products.

Also a method as in Patent Document 7, in which a pad is used to push and pressure a film to shape the film, has the same improvement room as described above.

The technique described in Patent Document 8 may undergo a case in which a film is used to push and spread a latex onto a convex surface of a lens substrate, so that stress may be applied to the film itself to affect optical properties of the film. Furthermore, if the thickness of the latex layer is uneven, a shaped film having a desired surface shape may not be obtained. In such manners, there remains a room for improving the yield of products.

Solution to Problems

The present invention can be described as follows:

[1] A process for producing a shaped film, comprising:
a step of arranging a thermoplastic resin film to divide a space into a first space located on one surface side of the film, and a second space located on the other surface side,
a step of heating the thermoplastic resin film,
a step of curving the thermoplastic resin film into one space by using a difference in pressure between the first space and the second space,
a step of stopping the curving step of the thermoplastic resin film in a state where at least a convex curved surface of both surfaces of the film is exposed into the space, and
a step of cooling the curved film.

[2] The process for producing a shaped film according to [1],
wherein the step of curving the thermoplastic resin film comprises:
a step of curving the thermoplastic resin film into a lower pressure space than other space by applying pressure in at least one of the first space and the second space.

[3] The process for producing a shaped film according to [1],
wherein the step of curving the thermoplastic resin film comprises:
a step of curving the thermoplastic resin film into a lower pressure space than other space by reducing pressure in at least one of the first space and the second space.

[4] The process for producing a shaped film according to [1], wherein the step of curving the thermoplastic resin film comprises:

a step of curving the thermoplastic resin film into the space reduced in pressure by applying pressure in one of the first space or the second space and further reducing pressure in the other space.

[5] The process for producing a shaped film according to [2] or [4], wherein the step of curving the thermoplastic resin film comprises:

a step of curving the thermoplastic resin film into the other space by charging a medium into one of the first space or the second space and increasing the inside of the one space in pressure.

[6] The process for producing a shaped film according to [2], using a shaping die arranged in the first space or the second space, and a medium-supplying unit which supplies a medium to a surface of the shaping die that faces the thermoplastic resin film, wherein the step of curving the thermoplastic resin film comprises:

a step of curving the thermoplastic resin film in a state where the thermoplastic resin film does not contact with the surface of the shaping die by using a difference in pressure which is caused by pressing the thermoplastic resin film with the medium supplied from the medium-supplying unit between the shaping die and the thermoplastic resin film in the first space or the second space.

[7] The process for producing a shaped film according to [6], wherein the surface of the shaping die that faces the thermoplastic resin film is a substantially semispherical convex surface or concave surface.

[8] The process for producing a shaped film according to [6] or [7], wherein the shaping die comprises a porous material.

[9] The process for producing a shaped film according to [5], wherein the step of curving the thermoplastic resin film into the other space comprises:

a step of curving the thermoplastic resin film into the other space at a temperature of 30 to 300° C. by charging a heated medium into the first space or the second space to increase the inside of this space in pressure.

[10] The process for producing a shaped film according to [5], wherein the step of curving the thermoplastic resin film into the other space comprises:

a step of controlling the curve quantity of the thermoplastic resin film on the basis of a position of the thermoplastic resin film that is detected through a position sensor.

[11] The process for producing a shaped film according to any one of [1] to [10], comprising a step of reheating the curved film before the step of cooling the curved film.

[12] The process for producing a shaped film according to [11], wherein the reheating step is performed at a heating temperature for the heating step or a higher temperature, and the melting point (Tm) of a resin comprised in the thermoplastic resin film or a lower temperature.

[13] The process for producing a shaped film according to any one of [1] to [12], wherein the step of arranging the thermoplastic resin film comprises a step of placing the thermoplastic resin film on a first shaping member having a first space which opens to one side to cover the opening, and further fixing the thermoplastic resin film to the end of the opening; and the step of curving the thermoplastic resin film comprises a step of curving the thermoplastic resin film in a state where the thermoplastic resin film does not contact with any inner wall surface of the first shaping member by using a difference in pressure between the first space, into which the one surface of the thermoplastic resin film is exposed, and the second space, into which the other surface of the thermoplastic resin film is exposed.

[14] The process for producing a shaped film according to [13], wherein at least a rear surface of the thermoplastic resin film surface exposed to the first space is covered with a second shaping member having a second space which opens to one side.

[15] The process for producing a shaped film according to [13], wherein the thermoplastic resin film and the first shaping member are arranged inside the surrounding member in a state where the thermoplastic resin film is fixed to the end of the opening in the first shaping member, and the other surface of the thermoplastic resin film is exposed into a surrounding member, and the step of curving the thermoplastic resin film comprises a step of curving the thermoplastic resin film by keeping one of the inside of the surrounding member or that of the first space at an ambient pressure while reducing the other inside in pressure.

[16] The process for producing a shaped film according to [13], wherein the thermoplastic resin film and the first shaping member are arranged inside the surrounding member in a state where the thermoplastic resin film is fixed to the end of the opening in the first shaping member, and the other surface of the thermoplastic resin film is exposed into a surrounding member, and the step of curving the thermoplastic resin film comprises a step of curving the thermoplastic resin film by keeping one of the inside of the surrounding member or that of the first space at an ambient pressure while increasing the other inside in pressure.

[17] The process for producing a shaped film according to [13], wherein the thermoplastic resin film and the first shaping member are arranged inside the surrounding member in a state where the thermoplastic resin film is fixed to the end of the opening in the first shaping member, and the other surface of the thermoplastic resin film is exposed into a surrounding member, and the step of curving the thermoplastic resin film comprises a step of curving the thermoplastic resin film by increasing one of the inside of the surrounding member or that of the first space in pressure while reducing the other inside in pressure.

[18] The process for producing a shaped film according to any one of [13] to [17], wherein the step of curving the thermoplastic resin film, and the step of reheating the curved film are performed as sequential steps in a state where the thermoplastic resin film is put over the first shaping member.

[19] The process for producing a shaped film according to any one of [15] to [18], wherein the surrounding member is equipped with:

a first heating unit which heats the thermoplastic resin film or a second heating unit which heats the inside of the surrounding member; and a pressure unit which increases the inside of the surrounding member or that of the first space of the first shaping member in pressure, or a decompression unit which reduces the inside of the surrounding member or the first space of the first shaping member in pressure.

[20] The process for producing a shaped film according to [19], wherein the pressure unit comprises a medium-introducing unit which charges the medium into the surrounding member or the first space of the first shaping member.

[21] The process for producing a shaped film according to [20], further comprising a third heating unit which heats the medium.

[22] The process for producing a shaped film according to any one of [19] to [21], further comprising a position sensor which can continuously measure the curving position of the thermoplastic resin film, and a control unit which controls the pressure unit on the basis of the position of the thermoplastic resin film that is measured by the position sensor.

[23] The process for producing a shaped film according to any one of [1] to [22], wherein the thermoplastic resin film is selected from polyvinyl alcohol films, polyester films, polyamide films, polyimide films, polyolefin films, polyvinyl chloride films, and polycarbonate films.

[24] A process for producing a polarizing film, comprising the step according to any one of [1] to [23].

[25] A process for producing a polarizing lens, comprising:

a step of arranging a thermoplastic resin film to divide a space into a first space located on one surface side of the film, and a second space located on the other surface side, a step of heating the thermoplastic resin film, a step of curving the thermoplastic resin film in one space by using a difference in pressure between the first space and the second space, a step of stopping the curving step of the thermoplastic resin film in a state where at least a convex curved surface of both surfaces of the film is exposed into the space, and a step of cooling the curved film to yield a polarizing film, and a step of stacking a lens substrate over at least one of both surfaces of the polarizing film.

Advantageous Effects of the Invention

The method of the present invention for producing a shaped film makes it possible to shape a thermoplastic resin film in a state where the film contacts with neither any mold nor others, so that surfaces thereof are not easily injured and further an foreign substance is not easily attached thereto. Thus, in a simple and easy manner, a shaped film can be yielded which has a substantially semispherical shape having a very smooth surface. In short, the producing method of the present invention improves the yield of shaped films, and optical materials and others using the shaped films.

Furthermore, molds therefor can easily be maintained or managed so that the production efficiency of products is improved.

BRIEF DESCRIPTION OF THE DRAWINGS

The above-mentioned object and other objects, characteristics and advantages will be made more evident by way of preferred embodiments described below, and the drawings attached thereto.

DESCRIPTION OF EMBODIMENTS

Figure 1:
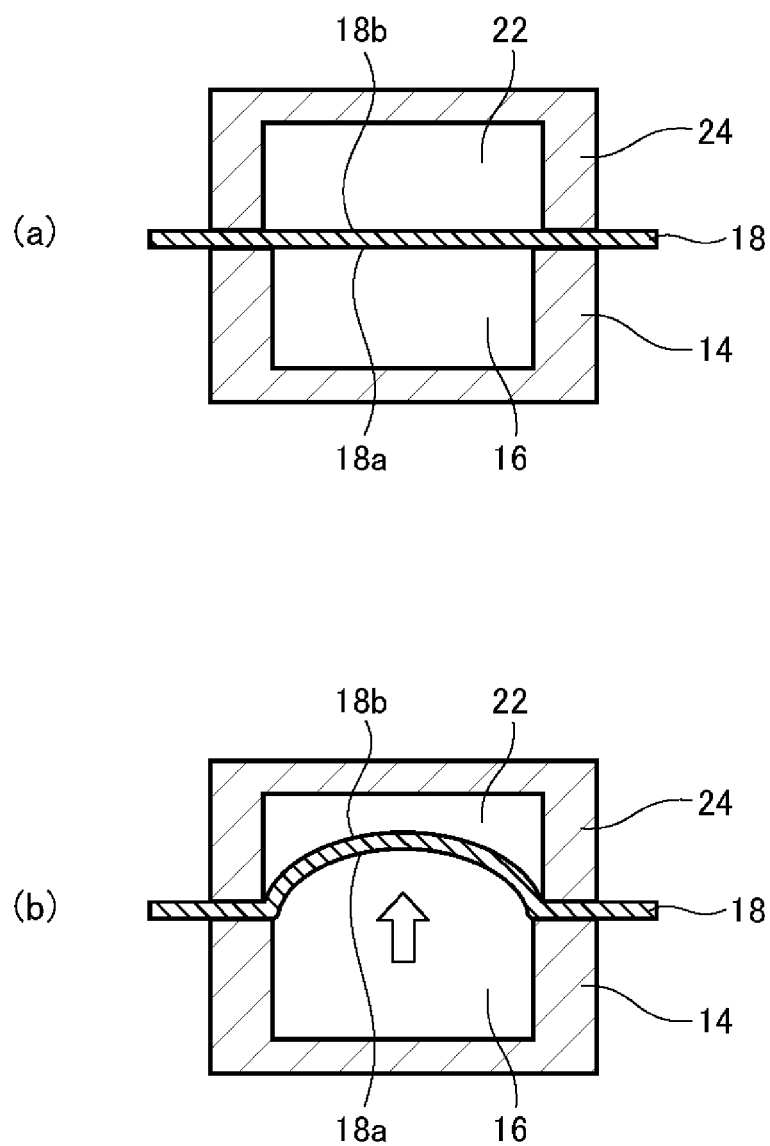
FIG. 1 is a sectional view which schematically illustrates a method in one of the present embodiments for producing a shaped film.

The method of the present invention, for producing a shaped film, comprising:

a step of arranging a thermoplastic resin film to divide a space into a first space located on one surface side of the film, and a second space located on the other surface side, a step of heating the thermoplastic resin film, a step of curving the thermoplastic resin film into one space by using a difference in pressure between the first space and the second space, a step of stopping the curving step of the thermoplastic resin film in a state where at least a convex curved surface of both surfaces of the film is exposed into the space, and a step of cooling the curved film.

Hereinafter, embodiments of the method of the present invention for producing a shaped film will be described while the drawings will be appropriately referred to. In the entire drawings, the same or similar signs are attached to the same or similar constituent elements, respectively. Descriptions thereabout will not be repeated.

A method of one of the present embodiments for producing a shaped film includes the following steps:

Step a of arranging a thermoplastic resin film 18 to divide a space into a first space 16 located on one surface 18a side of the film 18, and a second space 22 located on other surface 18b side (FIG. 1(a)), Step b of heating the thermoplastic resin film 18, Step c of curving the thermoplastic resin film 18 into the second space 22 by using a difference in pressure between the first space 16 and the second space 22(FIG. 1(b)), Step d of stopping the curving step of the thermoplastic resin film 18 in a state where the other surface 18b of the film 18 is exposed into the second space 22, and Step e of cooling the curved film. 18

Hereinafter, each of the steps will be described.

(Step a)

As illustrated in FIG. 1(a), in the step a, a thermoplastic resin film 18 is put in a first shaping member 14 having a first space 16 which opens to one side, so as to cover the opening. One surface 18a of the thermoplastic resin film 18 is exposed to the first space 16. Next, a second shaping member 24 having a second space 22 which opens to one side is used, and the other surface 18b of the thermoplastic resin film 18 is covered with the second shaping member 24 in such a manner that the other surface 18b of the film 18 is exposed into the second space 22.

The end of the opening in the first shaping member 14 and the end of the opening in the second shaping member 24 can be fitted to each other. The thermoplastic resin film 18 can be fixed to between these opening ends.

The first shaping member 14 and the second shaping member 24 are made of, for example, a metal.

The shape of the first space 16 is not particularly limited as far as the shape makes it possible to heat the thermoplastic resin film 18 without bringing the thermoplastic resin film 18 into contact with any inner wall surface of the space 16 of the first shaping member 14 in the shaping step. The shape of the second space 22 is not particularly limited as far as the shape makes it possible to use a difference in pressure between the inside of the first space 16 and that of the second space 22, and further heat the thermoplastic resin film 18 in the shaping step.

The first shaping member 14 may have a first heating unit which heats the thermoplastic resin film 18, and a second heating unit which heats the inside of the first space 16, a transporting unit which charges a medium for increasing the inside of the first space 16 in pressure into the first space 16, and a third heating unit which heats the medium, or a decompression unit which reduces the inside of the first space 16 in pressure. The present system may be configured to permit a heated medium to be circulated inside the first space 16. Furthermore, the first shaping member 14 may not be any closed system.

The second shaping member 24 may have a first heating unit which heats the thermoplastic resin film 18, and a second heating unit which heats the inside of the second space 22, a transporting unit which charges the medium into the second space 22 for increasing the inside of the second space 22 in pressure, and a third heating unit which heats the medium or a decompression unit which reduces the inside of the second space 22 in pressure. The present system may be configured to permit the heated medium to be circulated inside the second space 22. Furthermore, the second shaping member 24 may not be any closed system.

The medium is not particularly limited as far as the medium makes it possible to heat the thermoplastic resin film 18 and give a pressure difference to the front and rear surfaces of the film. Examples thereof include air, inert gases such as nitrogen, water vapor, and liquids such as water.

Examples of the first heating unit include an infrared ray radiating device, a heat-ray radiating device, and an oven. The second heating unit is, for example, an oven.

Examples of the thermoplastic resin film 18 include polyvinyl alcohol films, polyester films made of polyethylene terephthalate, polyethylene naphthalate or some other, polyamide films, polyimide films, polyolefin films, polyvinyl-chloride films, and polycarbonate films. About the film thickness of the thermoplastic resin film 18, a preferred film thickness thereof is varied in accordance with the usage of the resultant shaped film, and may be appropriately selected. The above-mentioned thermoplastic resin films may each contain, for example, a dichroic colorant, a photochromic dye, a specific wavelength cutting dye, a colorant, and an ultraviolet absorber.

(Step b)

Next, the thermoplastic resin film 18 is heated in a state where the end of the opening in the first shaping member 14 and the end of the opening in the second shaping member 24 can be fixed to each other.

The heating temperature is varied in accordance with whether or not the producing method has a reheating step which will be described later, and drawn states (a state as to whether or not the film is drawn, and the draw ratio), the material and the thickness of the thermoplastic resin film 18. In the case of a drawn polyester film, the heating temperature is from 30 to 300° C., preferably from 100 to 200° C., more preferably from 120 to 180° C. The heating temperature of the thermoplastic resin film 18 can be checked by measuring the temperature of the medium inside the space to which the film is exposed, or the temperature of the circumference surrounding the film.

In order to heat the thermoplastic resin film 18, the following methods are given: a method of using the first heating unit(s) located in the first shaping member 14 and/or the second shaping member 24 to heat the film by, for example, light and heat rays; and a method of using the second heating unit(s) located in the first shaping member 14 and/or the second shaping member 24 to heat the inside of the first space 16 and/or that of the second space 22. In the step c, the use of the heated medium makes it possible to heat the thermoplastic resin film 18.

The step b and the step c can be simultaneously attained by a method of circulating the heated medium into the first space 16.

(Step c)

Next, a difference in pressure between the inside of the first space 16 and that of the second space 22 is used to curve the thermoplastic resin film 18 in the space. This step is performed while the temperature for the step b is maintained or the system is heated.

In order to cause the generation of a difference in pressure between the inside of the first space 16 and that of the second space 22 as in the present step, the following forms can be given.

(i) While the second shaping member 24 is released toward the atmospheric air to keep the inside of the second space 22 at an ambient pressure, the medium is charged into the first space 16. When the heated medium is circulated into the first space 16, the step b and the step c can be simultaneously attained.

(ii) The medium is charged into the first space 16 and the second space 22 to make one of the spaces larger in pressure than the other space. When the heated medium is circulated into the first space 16 and/or the second space 22, the step b and the step c can be simultaneously attained.

(iii) While the decompression unit of the second shaping member 24 is used to reduce the inside of the second space 22 in pressure, the medium is charged into the first space 16. When the heated medium is circulated into the first space 16, the step b and the step c can be simultaneously attained.

(iv) While the decompression unit of the second shaping member 24 is used to reduce the inside of the second space 22 in pressure, the first shaping member 14 is released toward the atmospheric air to keep the inside of the first space 16 at an ambient pressure.

(v) The decompression unit of the first shaping member 14 is used to reduce the inside of the first space 16 in pressure and further the decompression unit of the second shaping member 24 is used to reduce the inside of the second space 22 in pressure to make one of the spaces larger in pressure than the other space.

The pressure of the inside of the first space 16 when this space is increased in pressure is varied in accordance with the material, the temperature and the film thickness of the thermoplastic resin film 18, and a desired curvature radius thereof. In the case of a drawn polyester film having a thickness of 100 to 200 µm, the pressure is from about 0.001 to 0.4 MPa. When the inside of the first space 16 and that of the second space 22 are increased in pressure, a difference between the pressures thereof may be appropriately set in accordance with the material, the temperature and the film thickness of the thermoplastic resin film 18, and a desired curvature radius thereof.

In the present step, the curvature radius of the thermoplastic resin film 18 is uniquely decided in accordance with a relationship between the elastic force of the film, and pressured applied thereto.

In the step c, the curve of the thermoplastic resin film 18 is controllable by checking the deformation quantity of the convex surface or concave surface of the curved shape of the thermoplastic resin film 18, which is formed in the film, the pressure, and others.

In the present embodiment, the step c may include the step of controlling the curve quantity of the thermoplastic resin film 18 on the basis of a change in the position of the thermoplastic resin film 18 that is detected through a position sensor not illustrated.

The position sensor may be located inside the first space 16 or the second space 22. The position sensor is made to detect a change in the position of the thermoplastic resin film 18 through a laser, and the like, and detect the curve quantity thereof. A control unit can control the output of the pressure unit or the decompression unit on the basis of the curve quantity to control the curve quantity of the thermoplastic resin film 18. This structure makes it possible to set the curve quantity of the thermoplastic resin film 18 precisely, and set the curved shape thereof at will. The standard position (change quantity: 0) of the thermoplastic resin film 18 may be rendered, for example, the position of the thermoplastic resin film 18 fixed to between the first shaping member 14 and the second shaping member 24.

The control unit can grasp the change (curve quantity) of the thermoplastic resin film 18 on the basis of the position of the thermoplastic resin film 18 that is read out through the position sensor, and can further control the output of the pressure unit or the decompression unit.

(Step d)

The curve of the thermoplastic resin film 18 is stopped in a state where the other surface 18b of the thermoplastic resin film 18 is exposed into the second space 22. This manner makes it possible to shape the thermoplastic resin film 18 without bringing the film into contact with the mold or others.

In the step d, by the position sensor, the control unit and others that are used in the step c, the thermoplastic resin film 18 can be curved into a desired shape, and the curve of the thermoplastic resin film 18 can be stopped in a state where the film does not contact with the second shaping member 24.

The present embodiment may include the step of improving the curved thermoplastic resin film 18 in thermal stability (heat setting step).

When the film is reheated, a temperature therefor may be set to a temperature equal to the heating temperature for the step b or a higher temperature, preferably to the heating temperature for the heating step or a higher temperature, and the melting point of the resin which the thermoplastic resin film is made of, or a lower temperature. In the case of reheating the film, it is usually preferred to keep the film or shrink the film for a predetermined period while the film is heated.

Through the reheating step, the thermoplastic resin film 18 can be decreased in dimension change based on thermal shrinkage and others. When the thermoplastic resin film 18 is made of a material which is thermally shrunken, the effect of dimension-stability (effect of controlling the shrinkage at the supposed use-temperature into a lower level) can be heightened by shrinking the film to some degree at the use temperature or higher.

The present step and the step c of curving the thermoplastic resin film 18 can be performed as sequential steps in a state where the thermoplastic resin film 18 is put on the first shaping member. Thus, in a simple and easily manner, a shaped film can be obtained.

(Step e)

Next, the curved thermoplastic resin film 18 obtained through the step d is cooled.

This step may be performed by a difference device. It is however preferred to end the heating of the thermoplastic resin film 18, and then cool the film while the pressure-increased state thereof is kept. In order to cool the film, for example, the following method is given: a method of lowering the medium in temperature, or a method of ending the heating based on the heating unit, and then returning the temperature to an ambient temperature.

The present embodiment including steps as described above makes it possible to yield a shaped film.

[Use]

The shaped film of the present embodiment is usable for various articles such as a polarizing substrate, polarizing plate or polarizing film for glasses or sunglasses, a specific-wavelength-cutting film, a light controlling film, a reflective concave mirror, and a light-condensing reflector.

Hereinafter, a description will be made about a plastic polarizing lens as an optical material in which the shaped film of the present embodiment is used as a polarizer.

[Plastic Polarizing Lens]

As the plastic polarizing lens of the present embodiment, a polarizing lens is usable which has a shaped film (polarizing film) yielded by the above-mentioned producing method, and a plastic lens substrate stacked on at least one surface of the polarizing film. Alternatively, as the plastic polarizing lens, only a polarizing substrate or polarizing plate made of a shaped film yielded by the above-mentioned producing method may be used.

As the polarizing film, various films may be used, examples thereof including a iodine-containing polyvinyl alcohol polarizing film, a dichroic-dye-containing polyvinyl alcohol polarizing film, and a dichroic-dye-containing thermoplastic polyester based polarizing film, and the like. The polyester based polarizing film may contain water to be more easily shaped compared with polyvinyl alcohol polarizing films.

The thickness of the polarizing film ranges usually from 1 to 500 µm, preferably from 10 to 300 µm.

The polarizing film may have a monolayered structure. The film may be formed to have a laminated structure in which the sheet(s) such as polycarbonate, triacetylcellulose, polyamide, acrylic polymer, polyethylene terephthalate, cyclic olefin copolymer, or cycloolefin polymer are laminated onto both surfaces or a single surface of a polarizing film.

The polarizing substrate or the polarizing plate may also be formed to have a laminated structure in which one or more of the above-mentioned sheets are laminated onto both surfaces or a single surface of a polarizing substrate or polarizing plate. The thickness of the polarizing substrate or polarizing plate ranges usually from 10 to 2000 µm, preferably from 10 to 1000 µm.

The polarizing film may be used after subjected to one or more pre-treatments selected from primer (coating) treatment, chemical treatments (treatments with one or more chemicals such as a reactive gas, an acid and an alkali), corona discharge treatment, plasma treatment, ultraviolet radiating treatment, electron beam radiating treatment, surface-roughening treatment, flame treatment, etching treatment, washing treatment and others in order to improve the adhesiveness between the polarizing film and the resin of the lens substrate. Out of such pre-treatments, particularly preferred are one or more selected from primer coating treatment, chemical treatments, corona discharge treatment, and plasma treatment.

The resin which constitutes the lens substrate may be a thermosetting resin or a thermoplastic resin.

Examples of the thermosetting resin include urethane resin, thiourethane resin, acrylic resin, episulfide resin, and allyl diglycol carbonate resin, and the like. The thermosetting resin film may each contain, for example, an internal release agent, an ultraviolet absorber, an antioxidant, a light stabilizer, an oil-soluble colorant, a photochromic dye, a specific wavelength cutting dye, a bluing agent, a chain extender, a crosslinking agent or a filler, and the like.

Examples of the thermoplastic resin include polycarbonate, polyamide, polymethyl methacrylate, polyester, polyolefin, polyurethane, polyetherketone, polyethersulfone, and polyvinyl chloride. A mixture in which two or more of these resins are mixed with each other may be used as an alloy.

Various function-supplying agents may be added to these thermoplastic resins. Example of the function-supplying agents include an ultraviolet absorber, a heat stabilizer, an antioxidant, a light stabilizer, a flame retardant, a photochromic dye, a specific wavelength cutting dye, a pigment, a colorant, a lubricant, a plasticizer, an antioxidant, an antifog additive, and an antibacterial agent.

It is particularly preferred to add a phosphorus based heat stabilizer or a hindered phenol based antioxidant to prevent the generation of foreign substances when the resin is melted and kneaded in a kneading step or in a product-producing step.

A release agent may be optionally blended. As the release agent, an aliphatic acid ester is preferably usable. For example, the following is usable: lower aliphatic acid esters such as stearic acid monoglycerides, stearyl stearate, higher aliphatic acid esters such as behenyl sebacate, and erythritol esters such as pentaerythritol tetrastearate.

The above has described the embodiment of the present invention. However, the embodiment is an example of the present invention. Thus, various structures may be adopted as far as the structures do not damage the advantageous effects of the present invention.

Figure 2:
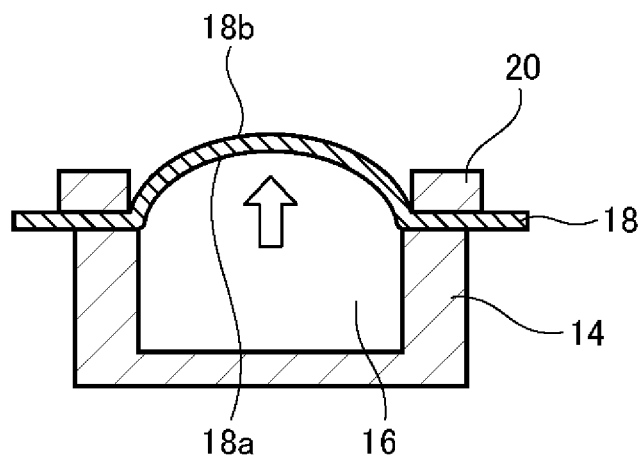
FIG. 2 is a sectional view which schematically illustrates a method in one of the present embodiments for producing a shaped film.

As illustrated in FIG. 2, for example, a thermoplastic resin film 18 is put on a first shaping member 14 having a first space 16 which opens to one side, so as to cover the opening. Next, the curved thermoplastic resin film 18 is fixed to the end of the opening by a fixing member 20. In this way, the thermoplastic resin film 18 is arranged to divide the first space 16 on one-surface-18a-side of the thermoplastic resin film 18 from a space on the other-surface-18b-side.

As illustrated in FIG. 2, the inside of the first space 16 is increased in pressure to curve the thermoplastic resin film 18. The inside of the first space 16 may be reduced in pressure to curve the thermoplastic resin film 18 into the first space 16.

In the step of heating the thermoplastic resin film 18, in the case of the heating by light or infrared rays, the film may be directly heated from the other-surface-18b-side of the thermoplastic resin film 18. The step of curving the thermoplastic resin film 18 may be attained by increasing the inside of the first space 16 in pressure.

The method illustrated in FIG. 2 may be performed inside a surrounding member not illustrated. The surrounding member may be equipped with a heating unit which heats the inside of the surrounding member, a pressure unit which uses a gas or water vapor to increase the inside of the surrounding member in pressure, a heating unit which heats the gas or water vapor, a pressure unit which increases the inside of the first space 16 in pressure, and a decompression unit which reduces the inside of the first space 16 in pressure. Furthermore, the surrounding member may be formed to be releasable toward the atmospheric air to keep the inside of the surrounding member and the inside of the first space 16 at an ambient pressure.

When the method illustrated in FIG. 2 is performed inside the surrounding member, the step of curving the thermoplastic resin film 18 can be made into the following forms:

(1) While the inside of the surrounding member is kept at an ambient pressure, the inside of the first space 16 is increased in pressure to curve the thermoplastic resin film 18.

(2) The inside of the surrounding member and the inside of the first space 16 are increased in pressure to make the inside of the first space 16 larger in pressure than the inside of the surrounding member to curve the thermoplastic resin film 18.

(3) The inside of the surrounding member is reduced in pressure and the inside of the first space 16 is increased in pressure to curve the thermoplastic 18.

(4) The inside of the surrounding member and the inside of the first space 16 are reduced in pressure to make the inside of the first space 16 larger in pressure than the inside of the surrounding member to curve the thermoplastic resin film 18.

In FIG. 2, the description has been made through the embodiment in which the thermoplastic resin film 18 is curved into the other-surface-18b direction. However, an embodiment may be adopted in which the inside of the first space 16 is reduced in pressure to curve the thermoplastic resin film 18 into the one-surface-18a direction.

When the thermoplastic resin film 18 is arranged inside the surrounding member, the step of curving the film may be made into the following forms.

(1) While the inside of the surrounding member is kept at an ambient pressure, the inside of the first space 16 is reduced in pressure to curve the thermoplastic resin film 18.

(2) While the inside of the first space 16 is kept at an ambient pressure, the inside of the surrounding member is increased in pressure to curve the thermoplastic resin film 18.

(3) The inside of the surrounding member is increased in pressure the inside of the first space 16 is reduced in pressure to curve the thermoplastic resin film 18.

Figure 3:
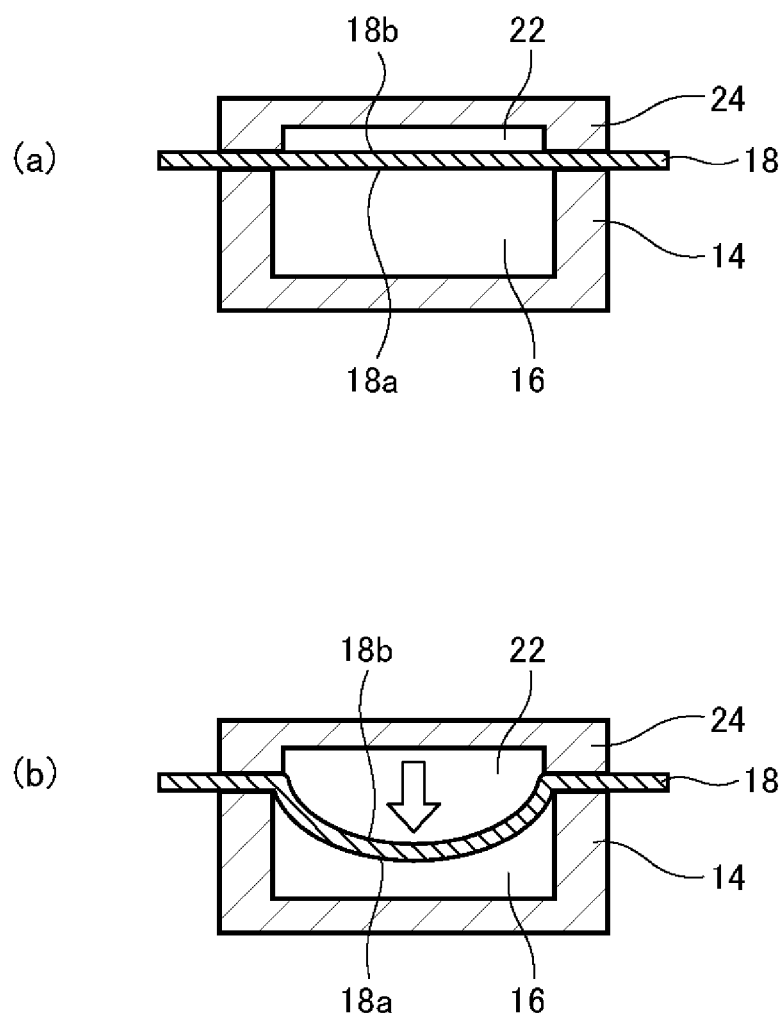
FIG. 3 is a sectional view which schematically illustrates a method in one of the present embodiments for producing a shaped film.

As illustrated in FIG. 3, a shaped film can be produced, and this producing method has the following steps:

Step a of arranging a thermoplastic resin film 18 to divide, through the use of the thermoplastic resin film 18, a space into a first space 16 on one-surface-18a-side of the film, and a second space 22 on the other-surface-18b-side (FIG. 3(a)).

Step b of heating the thermoplastic resin film 18.

Step c of curving the thermoplastic resin film 18 into the first space 16 without using any shaping die by using a difference in pressure between the inside of the first space 16 and that of the second space 22 (FIG. 3(b)).

Step d of stopping the curve of the thermoplastic resin film 18 in a state where the one surface 18a of the thermoplastic resin film 18 is exposed into the first space 16.

Step e of cooling the curved thermoplastic resin film 18.

Substantially the same constituents as in the embodiment described about FIG. 1 may be adopted, and descriptions about substantially the same steps will not be repeated.

In order to cause the generation of a difference in pressure between the inside of the first space 16 and that of the second space 22 in the step c, the following forms can be given.

(i) While the first shaping member 14 is released toward the atmospheric air to keep the inside of the first space 16 at an ambient pressure, a medium is charged into the second space 22. When heated medium is circulated into the second space 22, the step b and the step c can be simultaneously attained.

(ii) The medium is charged into the first space 16 and the second space 22 to make the second space 22 larger in pressure. When the heated medium is circulated into the first space 16 and/or the second space 22, the step b and the step c can be simultaneously attained.

(iii) While the decompression unit of the first shaping member 14 is used to reduce the inside of the first space 16 in pressure, the medium is charged into the second space 22. When heated medium is circulated into the second space 22, the step b and the step c can be simultaneously attained.

(iv) While the decompression unit of the first shaping member 14 is used to reduce the inside of the first space 16 in pressure, the second shaping member 24 is released toward the atmospheric air to keep the inside of the second space 22 at an ambient pressure.

(v) The decompression unit of the first shaping member 14 is used to reduce the inside of the first space 16 in pressure and further the decompression unit of the second shaping member 24 is used to reduce the inside of the second space 22 in pressure to make the second space 22 larger in pressure.

Figure 4:
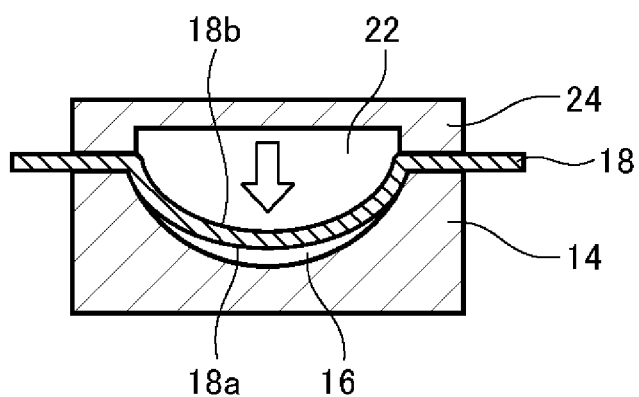
FIG. 4 is a sectional view which schematically illustrates a method in one of the present embodiments for producing a shaped film.

In a method as illustrated in FIG. 3, for producing a shaped film, a first shaping member 14 as illustrated in 4 is usable, which has a semispherical first space 16. For reference, conventionally, in an embodiment as illustrated in FIG. 4, a shaped film is produced by causing the film 18 to adhere closely onto the first shaping member 14 while pressurizing the film 18 from the second-space-22-side. However, the present embodiment makes it possible to produce a shaped film without bringing the film 18 into contact with the first shaping member 14.

In the present embodiment, the step of curving the thermoplastic resin film 18 is controllable by measuring, for example, the quantity of a change of the medium through the volume of the medium, which is used for the curving.

In the step of curving the thermoplastic resin film 18 in the present embodiment, for example, a liquid (such as oil) is filled into a space to be curved, and the end point of the curving is also controllable through the quantity of the liquid pushed out by curving the thermoplastic resin film 18.

Figure 5:
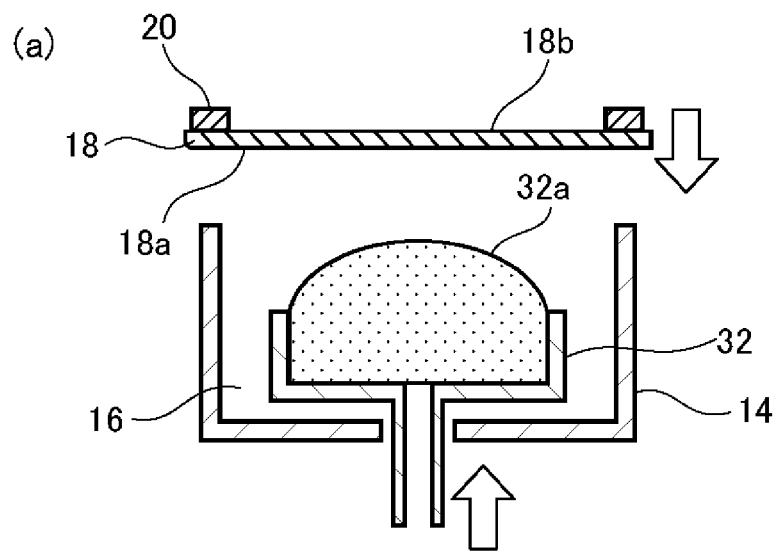
FIG. 5 is a sectional view which schematically illustrates a method in one of the present embodiments for producing a shaped film.
Figure 5:
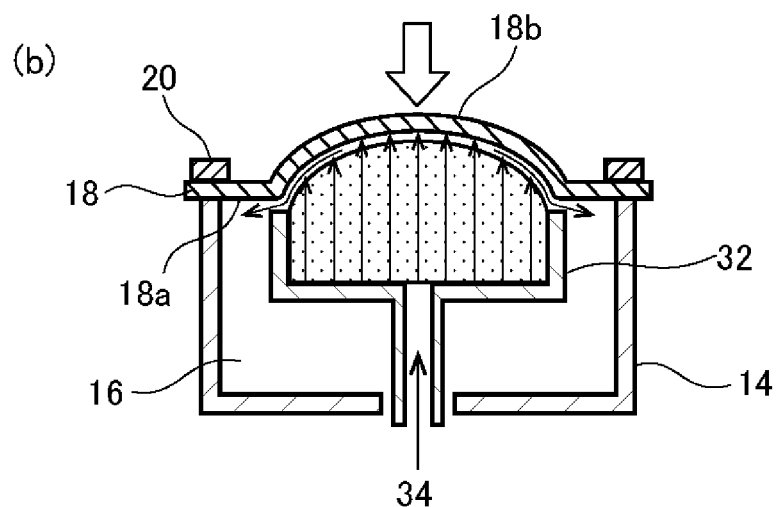

As illustrated in FIG. 5, a shaped film can be produced, and this producing method has the following steps:

Step a of arranging a thermoplastic resin film 18 to divide, through the use of the thermoplastic resin film 18, a space into a first space 16 on one-surface-18a-side of the film, and a second space on the other-surface-18b-side (FIG. 5(a)).

Step b of heating the thermoplastic resin film 18.

Step c of pushing and pressing, in the first space 16, the thermoplastic resin film 18 by a medium 34 supplied between a shaping die 32 and the thermoplastic resin film 18 in a state where the thermoplastic resin film 18 does not contact with the shaping die 32 to curve the thermoplastic resin film 18 by using a difference in pressure between the first space and the second space (FIG. 5(b)).

Step d: stopping the curve of the thermoplastic resin film 18. The other surface 18b of the thermoplastic resin film 18 is exposed into the second space.

Step e of cooling the curved thermoplastic resin film 18.

Substantially the same constituents as in the embodiment described about FIG. 1 may be adopted, and descriptions about substantially the same steps will not be repeated.

Step a

As illustrated in FIG. 5(a), a thermoplastic resin film 18 is put on a first shaping member 14 having a first space 16 which opens to one side, so as to cover the opening. Next, the curved thermoplastic resin film 18 is fixed to the end of the opening by a fixing member 20. In this way, the thermoplastic resin film 18 is arranged to divide the first space 16 on one-surface-18a-side of the thermoplastic resin film 18 from a space on the other-surface-18b-side.

In the first shaping member 14, a shaping die 32 movable up and down is arranged. A surface 32a of the shaping die 32 is a substantially semispherical convex surface. The shaping die 32 is made of, for example, a porous material having numerous pores; a product yielded by bundling hollow tubes with each other, and fixing the tubes onto each other to cause a medium to flow therein in one direction, for example, a hollow body yielded by bundling pipe-form shaped bodies with each other, and fixing the shaped bodies onto each other; a structure in which plural plates are used, for example, a lamellar laminated body formed by laminating plural plates onto each other to be made apart from each other to cause a medium to flow through gaps between the plates; a structure yielded by fabricating plural plates into the form of lattices or triangles; or a fibrous body yielded by fixing fibrous elements onto each other. The medium can be supplied to the surface 32a of the shaping die 32.

Examples of the porous material include a sintered metal; a sintered ceramic; a product in which inorganic (ceramic/metallic) particles coated with a binder are gathered and bound with each other; a foamed metal; a foamed plastic; a plastic particulate body in which particles are gathered and bound with each other; an organic polymer particulate body; a porous rubber; a product in which hollow yarns are bundled and fixed with/onto each other; a hollow body in which pipe-form structures made of, for example, a metal, ceramic, plastic or rubber are bundled and fixed with/onto each other; and a cavity body in which plate-form structures made of, for example, a metal, ceramic, plastic or rubber are stacked onto each other to have respective gaps between the structures.

The shaping die 32 has a medium-supplying unit not illustrated, and the medium can be supplied to the surface 32a from the inside of the shaping die 32. The medium is not particularly limited as far as the medium makes it possible to heat the thermoplastic resin film 18 and give a pressure difference to the front and rear surfaces of the film. Examples thereof include air, inert gases such as nitrogen, water vapor, and liquids such as water.

Step c

When the thermoplastic resin film 18 is fixed to the end of the opening by the fixing member 20, the shaping die 32 is shifted into the direction of the thermoplastic resin film 18, and further a medium 34 is supplied from the medium-supplying unit to the surface 32a of the shaping die 32. The shaping die 32 is further raised up to curve the thermoplastic resin film 18 by pushing and pressing force of the medium 34 (FIG. 5(b)).

The supply of the medium 34 to the surface 32a of the shaping die 32 makes it possible to form a layer of the medium 34 between the shaping die 32 and the thermoplastic resin film 18 to come to transfer the surface shape of the shaping die 32 without bringing the thermoplastic resin film 18 heated through the step b into contact with the shaping die 32.

In other words, when the shaping die 32 is shifted toward the thermoplastic film 18 to be gradually pushed into the film 18, an equilibrium state is generated at the distance permitting the following to be balanced with each other: the discharge pressure of the medium 34 jutted out from the surface of the shaping die 32; the resisting force of the film 18 into the direction of the shaping die, which is force being based on the elastic modulus of the film at the heating temperature of the film; and the pressured applied to the shaping die 32. Thus, the shape of the shaping die 32 is transferred onto the film 18 in a state where the shaping die 32 does not contact with the film 18. As a result, the thermoplastic resin film can be curved. This material can be performed by a method similar to an ordinarily-performed method of bringing a film into contact with a shaping die to shape the film. However, the shaped film is not affected by the surface roughness of the shaping die since the shaped film does not contact with any shaping die.

The raising-up speed of the shaping die 32, the temperature, the supply amount and the supply speed of the medium 34, and others are adjusted to make the thermoplastic resin film 18 into a desired shape. In the present embodiment, the second space on the other-surface-18b-side of the thermoplastic resin film 18 is opened, and the atmospheric pressure is applied to the other surface 18b. However, as illustrated in FIG. 1, a second shaping member 24 having a second space 22 which opens to one side is used, and the other surface 18b can be covered with the second shaping member 24 in such a manner that the other surface 18b of the thermoplastic resin film 18 is exposed into the second space 22. In this way, the pressure of the inside of the second space 22 is adjustable.

Figure 6:
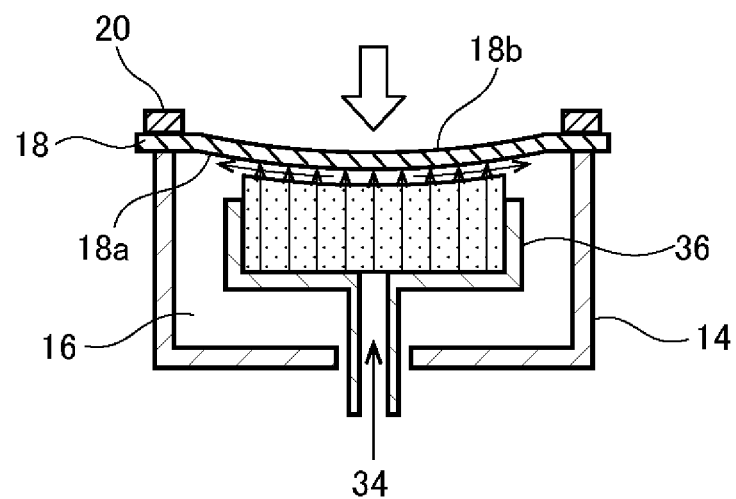
FIG. 6 is a sectional view which schematically illustrates a method in one of the present embodiments for producing a shaped film.

Moreover, as illustrated in FIG. 6, as the shaping die, a shaping die 36 is usable which has a surface that is a substantially semispherical concave surface.

In the embodiment in each of FIGS. 5 and 6, the system may be used in a state where the whole of the system is turned upside down, or used in a state where the system is laid down in the horizontal direction. In any one of these cases, the thermoplastic resin film can be shaped as described above.

An example of an optical material making use of the shaped film of the present embodiment as a polarizer is a glass polarizing lens. The glass polarizing lens may be a lens having a shaped film (polarizing film) yielded by the above-mentioned producing method, and a glass substrate stacked on at least one surface of the polarizing film.

EXAMPLES

Hereinafter, the present invention will be described in more detail by way of working examples thereof; however, the invention is not limited to these examples.

Example 1

Production of Shaped Film as Illustrated in FIG. 4.

The first shaping member 14 having, at a central portion of undersurface, a laser penetration hole having a diameter of 10 mm, and the second shaping member 24 were heated to 145 degrees (through a first heating unit), and a polarizing film (thickness: 140 micron) made of polyethylene terephthalate was horizontally put in between the members, and then the members were fitted and fixed to each other. A laser measurement was then made (through a CCD laser displacement gauge LK-G150 manufactured by Keyence Corp.) to set the distance of the film to zero, and then this system was kept for 120 seconds.

While the temperature was kept, the inside of the second space 22 was pressed by a pressure of 0.04 MPa to swell the polarizing film made of polyethylene terephthalate toward the first space 16. Thereafter, when the film distance reached −5.6 mm through the laser measurement, the film distance was kept between −5.6 mm and −5.2 mm for 30 seconds while the inside of the second space 22 was manually reduced by opening the space toward the atmospheric air or increased in pressure.

Furthermore, water was circulated into the first shape member 14 and the inside of the second space 22 was reduced or increased in pressure by opening the space toward the atmospheric air while the film distance was kept between −5.6 mm and −5.2 mm for 60 seconds. The first shaping member 14 and the second shaping member 24 were then opened to yield a shaped curved film having a height of 5.4 mm and a curvature radius of 130.4 mm.

The surfaces of the curved film were visually observed. As a result, it was verified that the surfaces had neither injures nor foreign substances to be very smooth. Furthermore, the curved film was cut into halves, and then the respective shapes of the cross sections were observed. As a result, it was verified that the shapes were substantially spherical shapes.

Example 2

Production of Shaped Film as Illustrated in FIG. 4.

The first shaping member 14 having, at a central portion of undersurface, a laser penetration hole having a diameter of 10 mm, and the second shaping member 24 were heated to 145 degrees (through a first heating unit), and a polarizing film (thickness: 140 micron) made of polyethylene terephthalate was horizontally put in between the members, and then the members were fitted and fixed to each other. A laser measurement was then made (through a CCD laser displacement gauge LK-G150 manufactured by Keyence Corp.) to set the distance of the film to zero, and then this system was kept for 120 seconds. While the temperature was kept, the inside of the second space 22 was pressed by a pressure of 0.04 MPa to swell the polarizing film made of polyethylene terephthalate toward the first space 16. Next, when the film distance reached −7.5 mm through the laser measurement, the film distance was kept between −7.5 mm and −6.5 mm for 30 seconds while the inside of the second space 22 was manually reduced by opening the space toward the atmospheric air or increased in pressure. Thereafter, the inside of the second space 22 was reduced in pressure by opening the space toward the atmospheric air to shrink the film down to a film distance of −5.4 mm. At this time, the film distance was kept between −5.6 mm and −5.2 mm for 30 seconds while the inside of the second space 22 was manually reduced by opening the space toward the atmospheric air or increased in pressure. Furthermore, water was circulated into the first shape member 14 and the inside of the second space 22 was reduced by opening the space toward the atmospheric air or increased in pressure while the film distance was kept between −5.6 mm and −5.2 mm for 60 seconds. The first shaping member 14 and the second shaping member 24 were then released to yield a shaped curved film having a height of 5.4 mm and a curvature radius of 130.4 mm.

The surfaces of the curved film were visually observed. As a result, it was verified that the surfaces had neither injures nor foreign substances to be very smooth. Furthermore, the curved film was cut into halves, and then the respective shapes of the cross sections were observed. As a result, it was verified that the shapes were substantially spherical shapes.

Example 3

Production of Polarizing Lens Using Shaped Film

The following were stirred: 50.6 parts by weight of m-xylylene diisocyanate; 49.4 parts by weight of a mixture of 4,8-dimercaptomethyl-1,11-dimercapto-3,6,9-trithiaundecane, 4,7-diemrcaptomethyl-1,11-dimercapto-3,6,9-trithiaundecane, and 5,7-dimercaptomethyl-1,11-dimercapto-3,6,9-trithiaundecane; 0.01 part by weight of dibutyltin dichloride as a curing promoter; a product Zelec UN (registered trade name, which is manufactured by a company Stepan) as a release agent; and 0.05 part by weight of a product Seesorb 709 (manufactured by Shipro Kasei Kaisha Ltd.) as an ultraviolet absorber. In this way, soluble components therein were dissolved, and then the solution was subjected to degassing treatment under a reduced pressure. Immediately after prepared, the mixture was supplied as a monomer mixture for injection. At one hour after the stirring and dissolving, the viscosity was 30 mPa·s at 20° C.

Next, this monomer mixture was filtrated through a 3 μm opening filter, and then injected through a tube into two cavity regions partitioned by two glass molds constituting a mold for lens-casting, and the shaped film which had been shaped in Example 1. The clearance between the cavity regions which had the narrowest gap was about 0.5 mm. After the injection, the mold for lens-casting was airtightly sealed and put in a hot wind circulating oven. Over 12 hours, the temperature thereof was raised from 25 to 108° C. Thereafter, the system was kept at 108° C. for 7 hours, and gradually cooled. The mold for lens-casting was then taken out from the oven. The lens was released from the mold for lens-casting, and annealed at 110° C. for 2.5 hours to yield a polarizing lens.

Example 4

One surface of a porous aluminum material having an average pore diameter of 15 μm and a porosity of 15%, was shaved into a concave form, and the rear surface thereof was shaven into a convex form. In this way, a porous material was prepared which had a substantially equal thickness. This porous material was arranged in the space 16 inside the mold in FIG. 3 to cause the concave mold surface to face a film, as represented by the mold 36 in FIG. 6. Specifically, in FIG. 6, instead of the fixing member 20, the second shaping member 24 in FIG. 3 was set to surround the material. Air (medium 34) was caused to flow toward the concave mold surface of the porous material under a pressure of 0.02 MPa from the rear surface side thereof.

The film, which was a PET uniaxially drawn film having a thickness of 140 μm, was fitted between the second shaping member 24 and the first shaping member 14. The whole was heated at a temperature of 145 degrees, and kept for 120 seconds. Air was then added into the second space 22 to give a pressure of 0.06 MPa. After 60 seconds elapsed, the second shaping member 24 and the first shaping member 14 were cooled to 80 degrees. Thereafter, the increase of the inside of the first space 16 and that of the second space 22 in pressure was stopped, and the fitting was released. The bent film was then taken out.

The surfaces of the resultant bent film were visually observed. As a result, it was verified that the surfaces had neither injures nor foreign substances to be very smooth. The production of a lens was succeeded in the same way as in Example 3.

This application claims the priority based on Japanese Patent Application No. 2016-032656 filed in Feb. 24, 2016, and the whole of the disclosure thereof is incorporated into this application.

The present invention can take the following embodiments:

[1] A process for producing a shaped film, comprising:

a step of arranging a thermoplastic resin film to divide, through the use of the thermoplastic resin film, a space into a first space on one surface side of the film, and a second space on the other surface side, a step of heating the thermoplastic resin film, a step of using a difference in pressure between the first space and the second space to curve the thermoplastic resin film in the space, and a step of cooling the curved film.

[2] The process for producing a shaped film according to item [1], wherein the step of curving the thermoplastic resin film includes:

a step of curving the thermoplastic resin film into the other space which is not pressured by increasing one of the inside of the first space or that of the second space in pressure.

[3] The process for producing a shaped film according to item [1], wherein the step of curving the thermoplastic resin film includes:

a step of curving the thermoplastic resin film into the space reduced in pressure by reducing one of the inside of the first space or that of the second space in pressure.

[4] The process for producing a shaped film according to item [1], wherein the step of curving the thermoplastic resin film includes:

a step of curving the thermoplastic resin film into a space reduced in pressure out of the two spaces by increasing one of the inside of the first space or that of the second space in pressure and further reducing the inside of the other space in pressure.

[5] The process for producing a shaped film according to item [2] or [4], wherein the step of curving the thermoplastic resin film includes:

a step of curving the thermoplastic resin film into the other space by charging a medium into one of the first space or the second space to increase the inside of the one space in pressure.

[6] The process for producing a shaped film according to item [5], wherein the step of curving the thermoplastic resin film into the other space includes:

a step of curving the thermoplastic resin film into the other space at a temperature of 30 to 300° C. by charging a heated medium into the first space or the second space to increase the inside of this space in pressure.

[7] The process for producing a shaped film according to item [5], wherein the step of curving the thermoplastic resin film includes:

a step of controlling the curve quantity of the thermoplastic resin film on the basis of a position of the thermoplastic resin film that is detected through a position sensor.

[8] The process for producing a shaped film according to any one of items [1] to [7], including
a step of reheating the curved film before the step of cooling the curved film.

[9] The process for producing a shaped film according to item [8],
wherein the reheating step is performed at a heating temperature for the heating step or a higher temperature, and the melting point (Tm) of a resin included in the thermoplastic resin film or a lower temperature.

[10] The process for producing a shaped film according to any one of items [1] to [9],
wherein the step of arranging the thermoplastic resin film comprises a step of placing the thermoplastic resin film on a first shaping member having a first space which opens to one side to cover the opening, and further fixing the thermoplastic resin film to the end of the opening; and
the step of curving the thermoplastic resin film comprises a step of curving the thermoplastic resin film in a state where the thermoplastic resin film does not contact with any inner wall surface of the first shaping member by using a difference in pressure between the first space, into which the one surface of the thermoplastic resin film is exposed, and the second space, into which the other surface of the thermoplastic resin film is exposed.

[11] The process for producing a shaped film according to item [10],
wherein at least a rear surface of the thermoplastic resin film surface exposed to the first space is covered with a second shaping member having a second space which opens to one side.

[12] The process for producing a shaped film according to item [10],
wherein the thermoplastic resin film and the first shaping member are arranged inside the surrounding member in a state where the thermoplastic resin film is fixed to the end of the opening in the first shaping member and the other surface of the thermoplastic resin film is exposed into a surrounding member, and
the step of curving the thermoplastic resin film includes a step of curving the thermoplastic resin film by keeping one of the inside of the surrounding member or that of the first space at an ambient pressure while reducing the other inside in pressure.

[13] The process for producing a shaped film according to item [10],
wherein the thermoplastic resin film and the first shaping member are arranged inside the surrounding member in a state where the thermoplastic resin film is fixed to the end of the opening in the first shaping member and the other surface of the thermoplastic resin film is exposed into a surrounding member, and
the step of curving the thermoplastic resin film includes a step of curving the thermoplastic resin film by keeping one of the inside of the surrounding member or that of the first space at an ambient pressure while increasing the other inside in pressure.

[14] The process for producing a shaped film according to item [10],
wherein the thermoplastic resin film and the first shaping member are arranged inside the surrounding member in a state where the thermoplastic resin film is fixed to the end of the opening in the first shaping member and the other surface of the thermoplastic resin film is exposed into a surrounding member, and
the step of curving the thermoplastic resin film includes a step of curving the thermoplastic resin film by increasing one of the inside of the surrounding member or that of the first space in pressure while reducing the other inside in pressure.

[15] The process for producing a shaped film according to any one of items [10] to [14],
wherein the step of curving the thermoplastic resin film, and the step of reheating the curved film are performed as sequential steps in a state where the thermoplastic resin film is placed over the first shaping member.

[16] The process for producing a shaped film according to any one of items [12] to [15],
wherein the surrounding member is equipped with:
a first heating unit which heats the thermoplastic resin film or a second heating unit which heats the inside of the surrounding member; and
a pressure unit which increases the inside of the surrounding member or that of the first space of the first shaping member in pressure, or a decompression unit which reduces the inside of the surrounding member or the first space of the first shaping member in pressure.

[17] The process for producing a shaped film according to item [16],
wherein the pressure unit includes a medium-introducing unit which charges the medium into the surrounding member or the first space of the first shaping member.

[18] The process for producing a shaped film according to item [17], further including a third heating unit which heats the medium.

[19] The process for producing a shaped film according to item [17] or [18], further including a position sensor which can continuously measure the curving position of the thermoplastic resin film, and
a control unit which controls the pressure unit on the basis of the position of the thermoplastic resin film that is measured by the position sensor.

[20] The process for producing a shaped film according to any one of items [1] to [19],
wherein the thermoplastic resin film is selected from polyvinyl alcohol films, polyester films, polyamide films, polyimide films, polyolefin films, polyvinylchloride films, and polycarbonate films.

[21] A process for producing a polarizing film, including the step according to any one of items [1] to [20].

[22] A process for producing a polarizing lens, comprising:
a step of arranging a thermoplastic resin film to divide, through the use of the thermoplastic resin film, a space into a first space on one surface side of the film, and a second space on the other surface side,
a step of heating the thermoplastic resin film,
a step of curving the thermoplastic resin film in the space by using a difference in pressure between the first space and the second space,
a step of cooling the curved film to yield a polarizing film, and
a step of stacking a lens substrate over at least one of both surfaces of the polarizing film.

The invention claimed is:
1. A process for producing a shaped film, comprising:
a step of arranging a thermoplastic resin film in a first shaping member having a first space which opens to one side, thereby covering an opening, wherein one surface of the thermoplastic resin film is exposed to the first space, wherein the thermoplastic resin film is fixed to an end of the opening of the first shaping member by a fixing member and the thermoplastic resin film is arranged to divide the first space on one surface side of the thermoplastic film from a second space located on the other surface side, a step of heating the thermoplastic resin film, a step of curving the thermoplastic resin film into a semispherical shape film into one space by controlling a difference in pressure between the first space and the second space while uniquely determining a radius of curvature of the thermoplastic resin film in accordance with a relationship of the radius of curvature of the thermoplastic resin film with the difference in pressure and an elastic force of the thermoplastic resin film, wherein the thermoplastic resin film is permitted to curve at the end of the opening of the first shaping member and the fixing member, a step of stopping the curving step of the thermoplastic resin film in a state where at least a convex curved surface of the film is exposed into the space, and a step of cooling the curved thermoplastic resin film, wherein the step of curving the thermoplastic resin film comprises:

applying a predetermined difference in pressure between the first space and the second space, detecting a change in position of the thermoplastic resin film, thereby obtaining the radius of curvature of the thermoplastic resin film, adjusting the difference in pressure between the first space and the second space, in accordance with a relationship of the difference in pressure with the elastic force of the thermoplastic resin film and the obtained radius of curvature of the thermoplastic resin film, and applying the adjusted difference in pressure between the first space and the second space.

2. The process for producing a shaped film according to claim 1, wherein the step of curving the thermoplastic resin film comprises:

a step of curving the thermoplastic resin film into a lower pressure space than other space by applying pressure in at least one of the first space and the second space.

3. The process for producing a shaped film according to claim 1, wherein the step of curving the thermoplastic resin film comprises:

a step of curving the thermoplastic resin film into a lower pressure space than other space by reducing pressure in at least one of the first space and the second space.

4. The process for producing a shaped film according to claim 1, wherein the step of curving the thermoplastic resin film comprises:

a step of curving the thermoplastic resin film into the space reduced in pressure by applying pressure in one of the first space or the second space and further reducing pressure in the other space.

5. The process for producing a shaped film according to claim 2, wherein the step of curving the thermoplastic resin film comprises:

a step of curving the thermoplastic resin film into the other space by charging a medium into one of the first space or the second space and increasing the inside of the one space in pressure.

6. The process for producing a shaped film according to claim 2, using a shaping die arranged in the first space or the second space, and a medium-supplying unit which supplies a medium to a surface of the shaping die that faces the thermoplastic resin film, wherein the step of curving the thermoplastic resin film comprises:

a step of curving the thermoplastic resin film in a state where the thermoplastic resin film does not contact with the surface of the shaping die by using a difference in pressure which is caused by pressing the thermoplastic resin film with the medium supplied from the medium-supplying unit between the shaping die and the thermoplastic resin film in the first space or the second space.

7. The process for producing a shaped film according to claim 6, wherein the surface of the shaping die that faces the thermoplastic resin film is a substantially semispherical convex surface or concave surface.

8. The process for producing a shaped film according to claim 6, wherein the shaping die comprises a porous material.

9. The process for producing a shaped film according to claim 5, wherein the step of curving the thermoplastic resin film into the other space comprises:

a step of curving the thermoplastic resin film into the other space at a temperature of 30 to 300° C. by charging a heated medium into the first space or the second space to increase the inside of this space in pressure.

10. The process for producing a shaped film according to claim 5, wherein the step of curving the thermoplastic resin film into the other space comprises:

a step of controlling the curve quantity of the thermoplastic resin film on the basis of a position of the thermoplastic resin film that is detected through a position sensor.

11. The process for producing a shaped film according to claim 1, comprising a step of reheating the curved thermoplastic resin film after the step of curving the thermoplastic resin film is stopped and before the step of cooling the curved thermoplastic resin film.

12. The process for producing a shaped film according to claim 11, wherein the reheating step is performed at a heating temperature for the heating step or a higher temperature, and the melting point (Tm) of a resin comprised in the thermoplastic resin film or a lower temperature.

13. The process for producing a shaped film according to claim 11, wherein the step of curving the thermoplastic resin film, and the step of reheating the curved thermoplastic resin film are performed as sequential steps in a state where the thermoplastic resin film is put over the first shaping member and the thermoplastic resin film is fixed between the end of the opening in the first shaping member and the fixed member.

14. The process for producing a shaped film according to claim 1, wherein the thermoplastic resin film is selected from polyvinyl alcohol films, polyester films, polyamide films, polyimide films, polyolefin films, polyvinyl chloride films, and polycarbonate films.

15. A process for producing a polarizing film, comprising the steps according to claim 1, wherein the shaped film is a polarizing film.

16. A process for producing a polarizing lens, comprising:
- a step of producing a shaped film according to the process of claim 1, and
- a step of stacking a lens substrate over at least one of both surfaces of a polarizing film.

17. The process for producing a shaped film according to claim 4,
wherein the step of curving the thermoplastic resin film comprises:
a step of curving the thermoplastic resin film into the other space by charging a medium into one of the first space or the second space and increasing the inside of the one space in pressure.

18. The process for producing a shaped film according to claim 1,
wherein the step of stopping the curving comprises stopping the curving in a state where a portion of the thermoplastic resin film that is not in contact with the first shaping member or the fixing member before the start of the curving is not in contact with either the first shaping member or the fixing member.

19. The process for producing a shaped film according to claim 1,
wherein, in the step of curving, shapes of the first shaping member and the fixing member are not changed while the thermoplastic resin film is curved.

20. The process for producing a shaped film according to claim 1,
wherein the fixing member is a second shaping member having a second space which opens to one side,
wherein the step of arranging a thermoplastic resin film comprises covering the other surface of the thermoplastic resin film with the second shaping member wherein the other surface of the thermoplastic resin film is exposed into the second space, wherein the thermoplastic resin is fixed between the opening ends of the first shaping member and the second shaping member.

21. The process for producing a shaped film according to claim 20,
wherein the curved thermoplastic resin film is convex toward the first space, and the depth from the opening to the bottom of the first space is greater than the depth from the opening to the bottom of the second space.

* * * * *